US012789912B2

(12) United States Patent
Ake

(10) Patent No.: US 12,789,912 B2
(45) Date of Patent: Nov. 10, 2026

(54) MUD FLAP HOLDER DEVICE

(71) Applicant: Jody Ake, Jacksboro, TX (US)

(72) Inventor: Jody Ake, Jacksboro, TX (US)

( * ) Notice: Subject to any disclaimer, the term of this patent is extended or adjusted under 35 U.S.C. 154(b) by 218 days.

(21) Appl. No.: 18/948,042

(22) Filed: Nov. 14, 2024

(65) Prior Publication Data

US 2026/0131862 A1 May 14, 2026

(51) Int. Cl.
*B62D 25/18* (2006.01)
*B62D 25/16* (2006.01)

(52) U.S. Cl.
CPC ......... *B62D 25/182* (2013.01); *B62D 25/163* (2013.01)

(58) Field of Classification Search
CPC ... B62D 25/182; B62D 25/163; B62D 25/186
See application file for complete search history.

(56) References Cited

U.S. PATENT DOCUMENTS 2,721,760 A * 10/1955 Frazier ................. B62D 25/188 280/848
2,857,200 A * 10/1958 Hoppesch ............ B62D 25/188 298/1 SG
2,981,553 A * 4/1961 Zerbe, Sr. ............ B62D 25/188 298/1 SG
3,165,360 A * 1/1965 Saxton ................. B62D 25/188 298/1 SG
3,203,710 A * 8/1965 Harting, Jr. .......... B62D 25/188 298/1 SG
3,248,126 A * 4/1966 Saxton ................. B62D 25/188 298/1 SG
3,507,513 A * 4/1970 Bohrer ................. B62D 25/188 298/1 SG
3,582,109 A * 6/1971 Moore ................. B62D 25/188 298/1 SG
3,802,739 A * 4/1974 Knyszel ............... B62D 25/188 298/1 SG
3,806,196 A * 4/1974 Cole .................... B62D 25/188 298/1 SG
3,806,197 A * 4/1974 Knyszek .............. B62D 25/188 298/1 SG
4,097,090 A * 6/1978 Payne .................. B62D 25/188 298/1 SG
4,221,432 A * 9/1980 VanRemortel ....... B62D 25/188 298/1 SG (Continued)

FOREIGN PATENT DOCUMENTS

CA 2813890 10/2013
WO WO-2019215352 A1 * 11/2019 ........... B62D 25/182

*Primary Examiner* — Jacob B Meyer

(57) ABSTRACT

A mud flap holder device includes a cylindrical housing which has a mounting plate that is attachable to a frame of a vehicle to orient the cylindrical housing behind a wheel of the vehicle. A roller is rotatably positioned in the cylindrical housing and the roller has a jaw extending downwardly from the roller. A mud flap can be compressed between the jaw of the roller and a jaw of the cylindrical housing for releasably retaining the mud flap on the vehicle. The mud flap is pulled outwardly from between the jaw of the roller and the jaw of the cylindrical housing when the wheel of the vehicle rolls over the mud flap when the vehicle is backing up to inhibit the mud flap from being damaged. A locking mechanism is movably attached to the cylindrical housing to either lock the roller or enable the roller to rotate.

10 Claims, 8 Drawing Sheets

(56) References Cited

U.S. PATENT DOCUMENTS

| | | | | | |
|---|---|---|---|---|---|
| 5,582,431 | A * | 12/1996 | Anderson | B62D 25/188 | 280/851 |
| D415,086 | S | 10/1999 | Larkin | | |
| 6,139,062 | A * | 10/2000 | Meyer | B60P 1/283 | 280/847 |
| 6,158,775 | A * | 12/2000 | Nickels | B62D 25/188 | 280/847 |
| 6,446,900 | B1 * | 9/2002 | Syska | B62D 25/188 | 242/403 |
| 6,565,122 | B1 * | 5/2003 | Hansen | B62D 25/188 | 280/851 |
| 6,604,724 | B2 * | 8/2003 | Hawes | B62D 25/182 | 280/848 |
| 6,623,038 | B2 * | 9/2003 | Heem | B62D 25/188 | 280/847 |
| 6,799,808 | B1 * | 10/2004 | Walters | B62D 25/182 | 298/1 SG |
| 7,021,665 | B2 * | 4/2006 | Keller | B62D 25/182 | 280/154 |
| 7,185,920 | B2 * | 3/2007 | Drummond | B62D 25/168 | 280/851 |
| 7,708,315 | B1 * | 5/2010 | Dumitrascu | B62D 25/188 | 280/848 |
| 7,850,206 | B2 * | 12/2010 | Proctor | B62D 25/182 | 280/848 |
| 8,066,304 | B2 * | 11/2011 | Ulgen | B62D 25/182 | 280/847 |
| 8,579,314 | B2 * | 11/2013 | Prazen | B62D 25/188 | 280/154 |
| 8,783,727 | B2 * | 7/2014 | Flaman | B62D 25/182 | 280/852 |
| 8,864,176 | B2 * | 10/2014 | Lasser | B62D 25/182 | 280/847 |
| 9,296,268 | B2 * | 3/2016 | Smith | B60C 27/145 | |
| 9,352,786 | B1 * | 5/2016 | Martin | B62D 25/182 | |
| 9,802,652 | B1 * | 10/2017 | Cox | B62D 25/182 | |
| 9,884,656 | B2 * | 2/2018 | Proctor | B62D 25/182 | |
| 9,969,436 | B1 * | 5/2018 | Gause | B60R 16/023 | |
| 10,252,752 | B2 * | 4/2019 | Reus | B62D 25/182 | |
| 10,683,041 | B1 * | 6/2020 | Smith | B60P 1/283 | |
| 11,390,329 | B2 | 7/2022 | Koontz | | |
| 12,473,036 | B2 * | 11/2025 | Cressman | B62D 25/163 | |
| 12,600,416 | B2 * | 4/2026 | Gangstad | B62D 25/163 | |
| 2003/0184078 | A1 * | 10/2003 | Grable | B62D 25/188 | 280/847 |
| 2004/0164539 | A1 * | 8/2004 | Bernard | B62D 25/182 | 280/848 |
| 2005/0212282 | A1 * | 9/2005 | Markham | B62D 25/182 | 280/851 |
| 2012/0068448 | A1 * | 3/2012 | Lasser | B62D 25/182 | 29/428 |
| 2013/0282235 | A1 | 10/2013 | Kamminga | | |
| 2014/0312604 | A1 * | 10/2014 | Carrillo | B62D 25/168 | 29/428 |
| 2018/0244141 | A1 * | 8/2018 | Mathiasen | B60J 11/10 | |
| 2019/0351949 | A1 | 11/2019 | Kinney | | |
| 2024/0351640 | A1 * | 10/2024 | Reus | B62D 25/182 | |
| 2025/0269907 | A1 * | 8/2025 | Page | B62D 25/182 | |
| 2026/0131862 | A1 * | 5/2026 | Ake | B62D 25/163 | |

* cited by examiner

MUD FLAP HOLDER DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to mud flap devices and more particularly pertains to a new mud flap device for releasably attaching a mud flap to a vehicle. The device includes a cylindrical housing that is mountable to a frame of a vehicle and a roller that is rotatably disposed within the cylindrical housing. The device includes a jaw that is attached to the roller and a jaw that is integrated into the cylindrical housing to enable a mud flap to be compressed between the jaw of the roller and the jaw of the cylindrical housing. The device includes a locking mechanism that is movably integrated into the cylindrical housing which releasably engages the roller to either inhibit the roller from rotating or to enable the roller to be rotated.

(2) Description of Related Art Including Information Disclosed Under 37 CFR 1.97 and 1.98

The prior art relates to mud flap devices including a variety of retractable mud flap devices that each at least includes a rotating retraction mechanism that is mountable to a vehicle and a mud flap that is attached to the rotating retraction mechanism for retracting the mud flap to inhibit the mud flap from being damaged as a result of being backed over by the vehicle when the vehicle is backing up. In no instance does the prior art disclose a mud flap holding device that includes a cylindrical housing which is mountable to a vehicle and a roller that is rotatably disposed on the cylindrical housing which enables a mud flap to be compressed between the cylindrical housing and the roller to enable the mud flap to be pulled away from the cylindrical housing and the roller when the vehicle backs over the mud flap thereby inhibiting the mud flap from being damaged and to enable the mud flap to be reattached to the vehicle.

(h) BRIEF SUMMARY OF THE INVENTION

An embodiment of the disclosure meets the needs presented above by generally comprising a cylindrical housing which has a mounting plate that is attachable to a frame of a vehicle to orient the cylindrical housing behind a wheel of the vehicle. A roller is rotatably positioned in the cylindrical housing and the roller has a jaw extending downwardly from the roller. A mud flap can be compressed between the jaw of the roller and a jaw of the cylindrical housing for releasably retaining the mud flap on the vehicle. The mud flap is pulled outwardly from between the jaw of the roller and the jaw of the cylindrical housing when the wheel of the vehicle rolls over the mud flap when the vehicle is backing up to inhibit the mud flap from being damaged. A locking mechanism is movably attached to the cylindrical housing to either lock the roller or enable the roller to rotate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
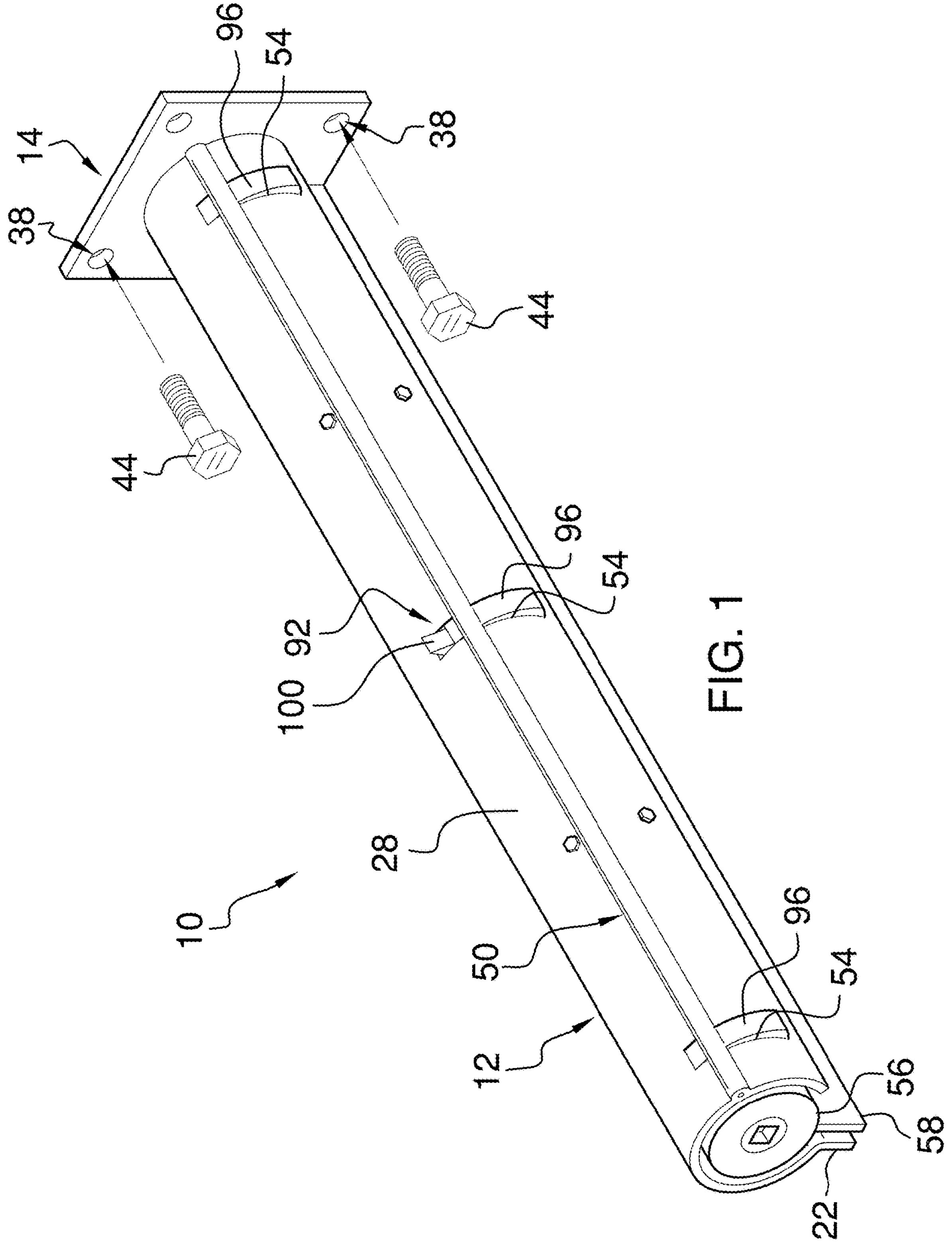
FIG. 1 is a perspective view of a mud flap holder device according to an embodiment of the disclosure.
Figure 2:
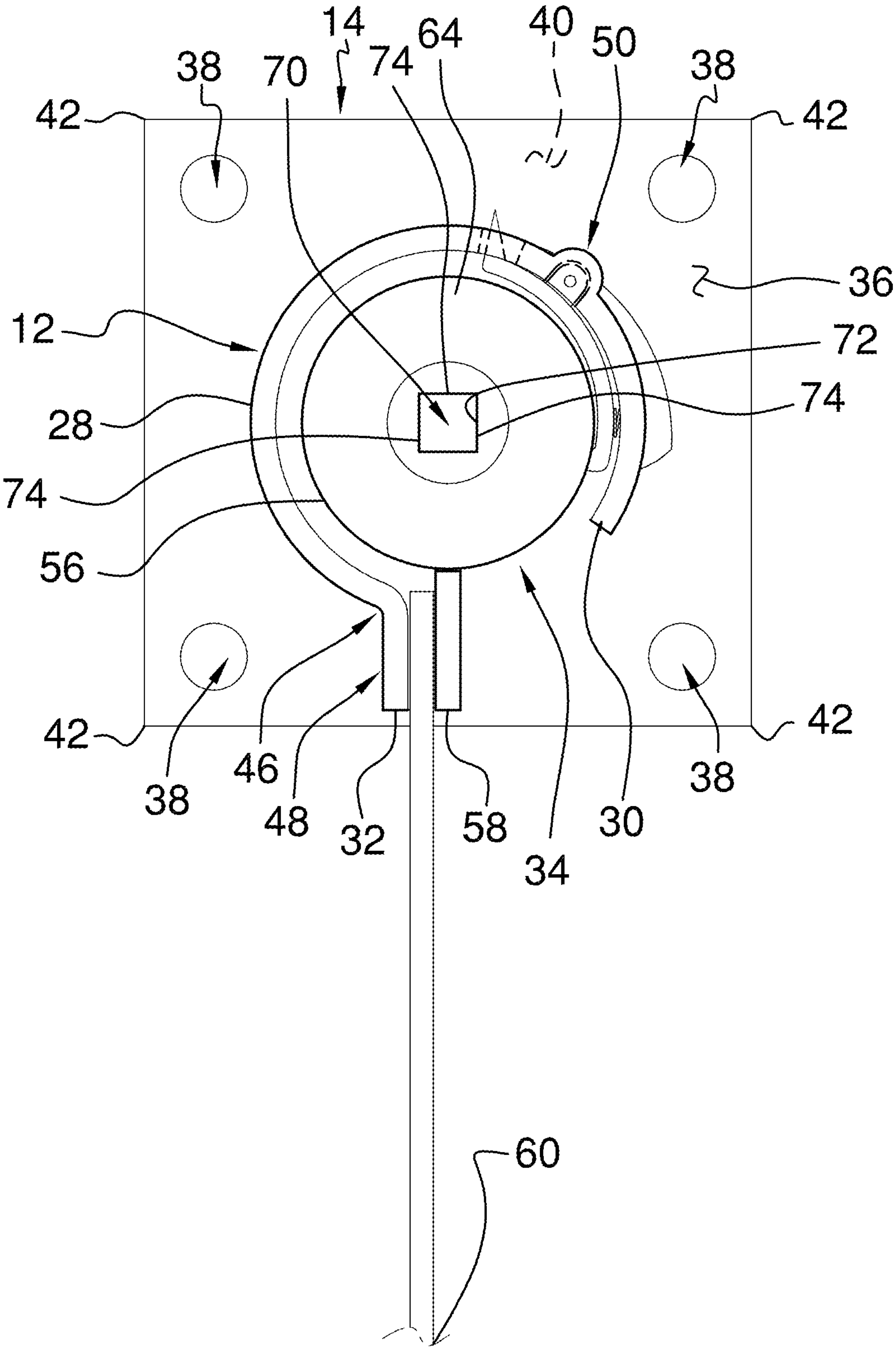
FIG. 2 is a left side view of an embodiment of the disclosure.
Figure 3:
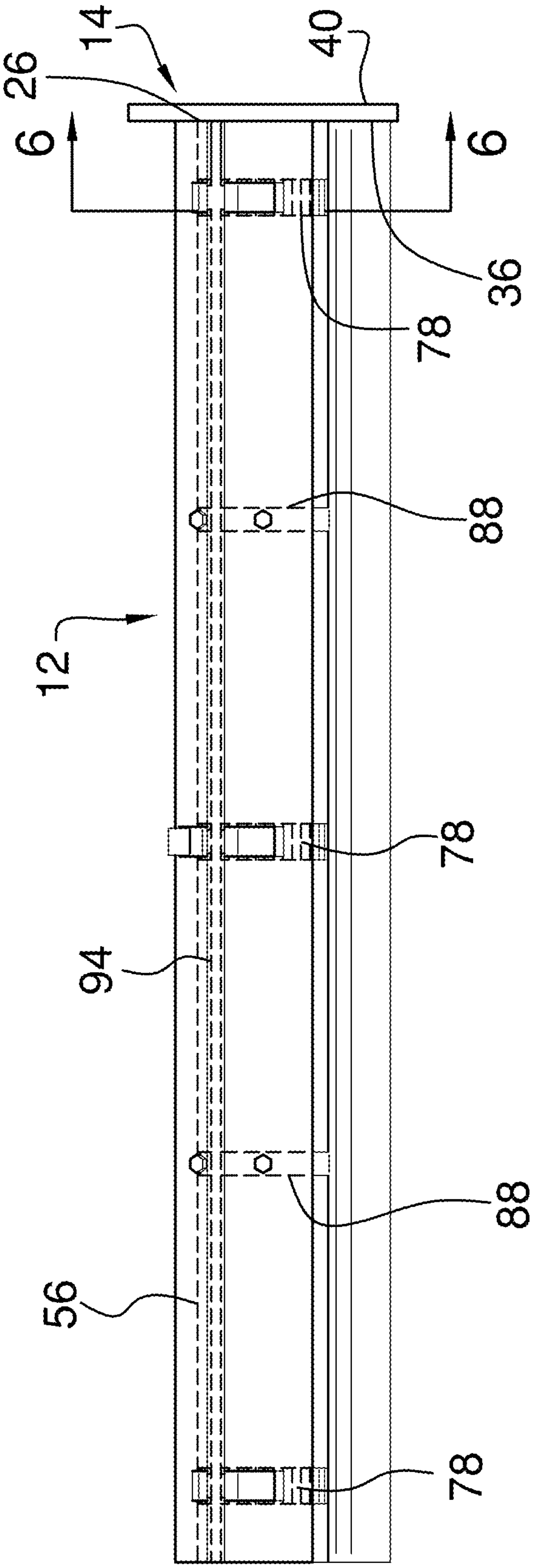
FIG. 3 is a front phantom view of an embodiment of the disclosure.
Figure 4:
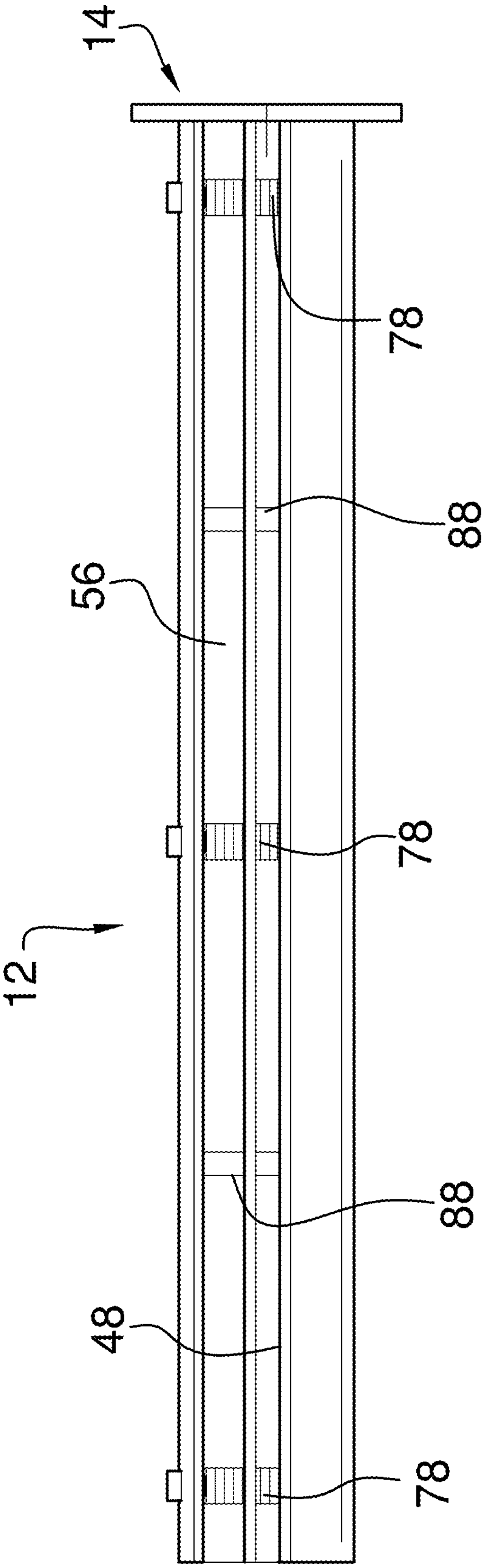
FIG. 4 is a bottom view of an embodiment of the disclosure.
Figure 5:
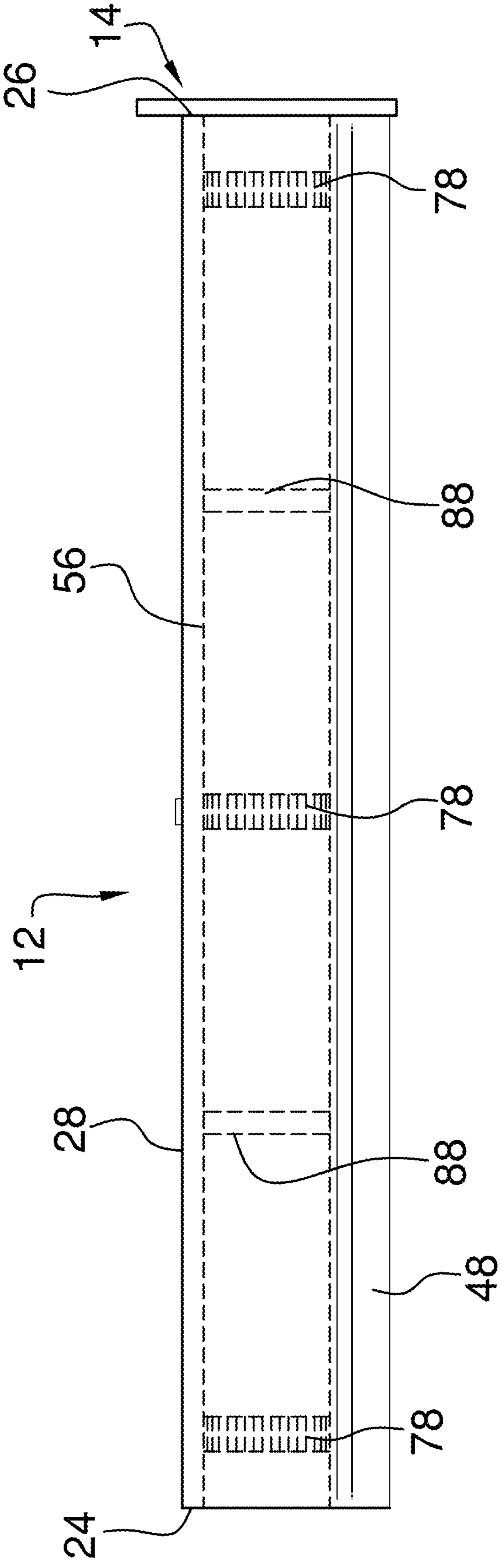
FIG. 5 is a back phantom view of an embodiment of the disclosure.
Figure 6:
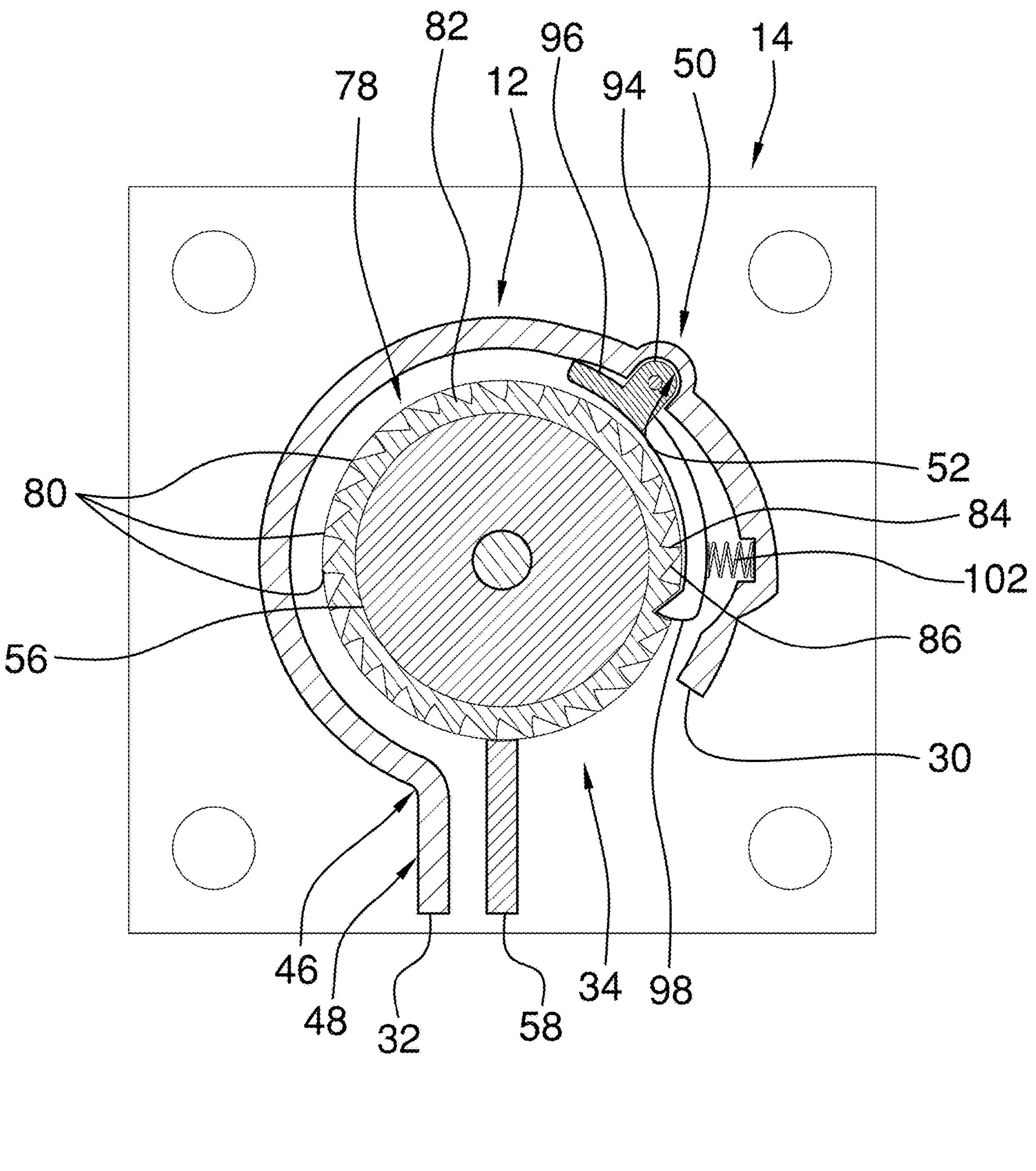
FIG. 6 is a cross sectional view taken along line 6-6 of FIG. 3 of an embodiment of the disclosure.
Figure 7:
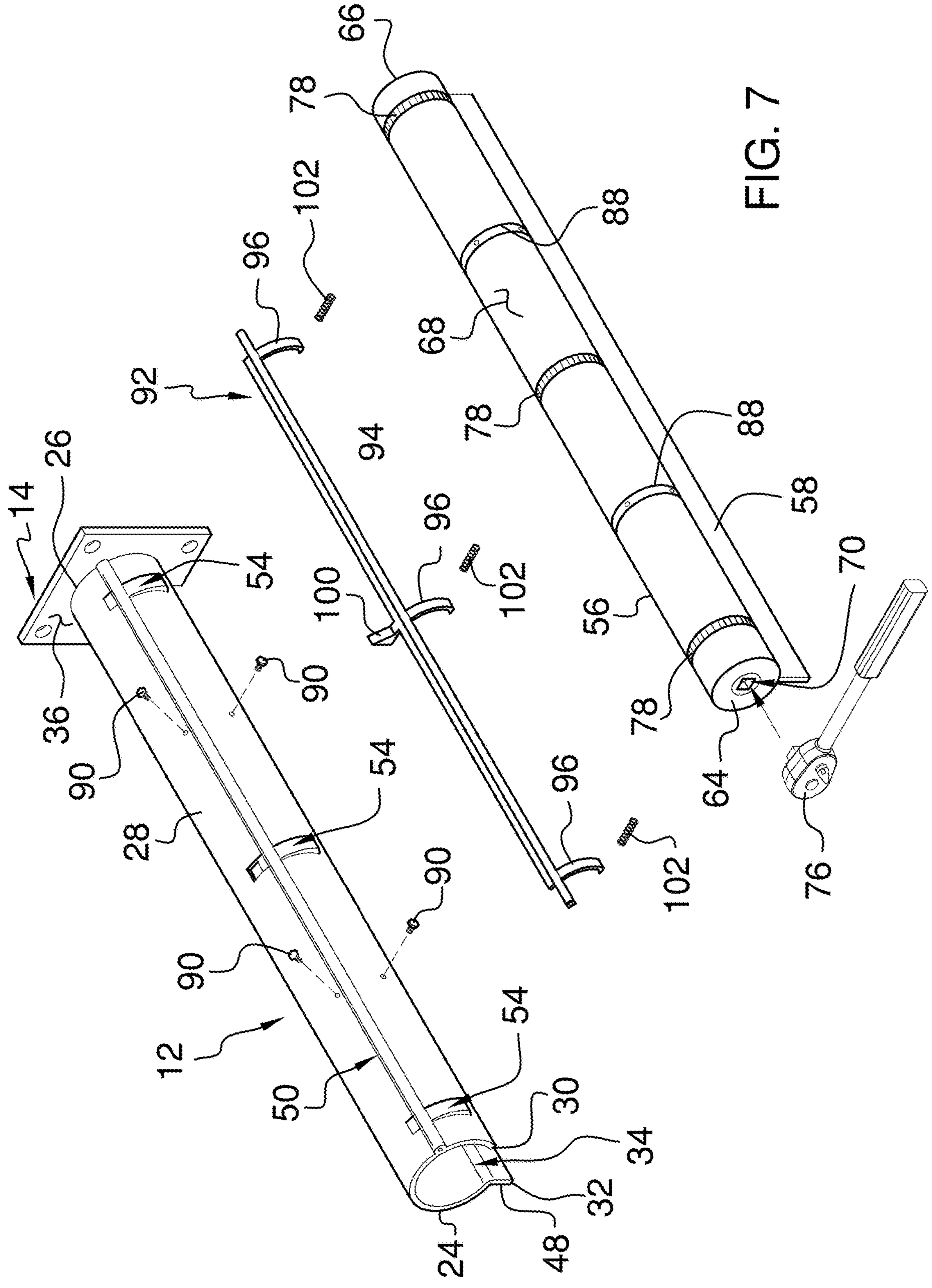
FIG. 7 is an exploded perspective view of an embodiment of the disclosure.
Figure 8:
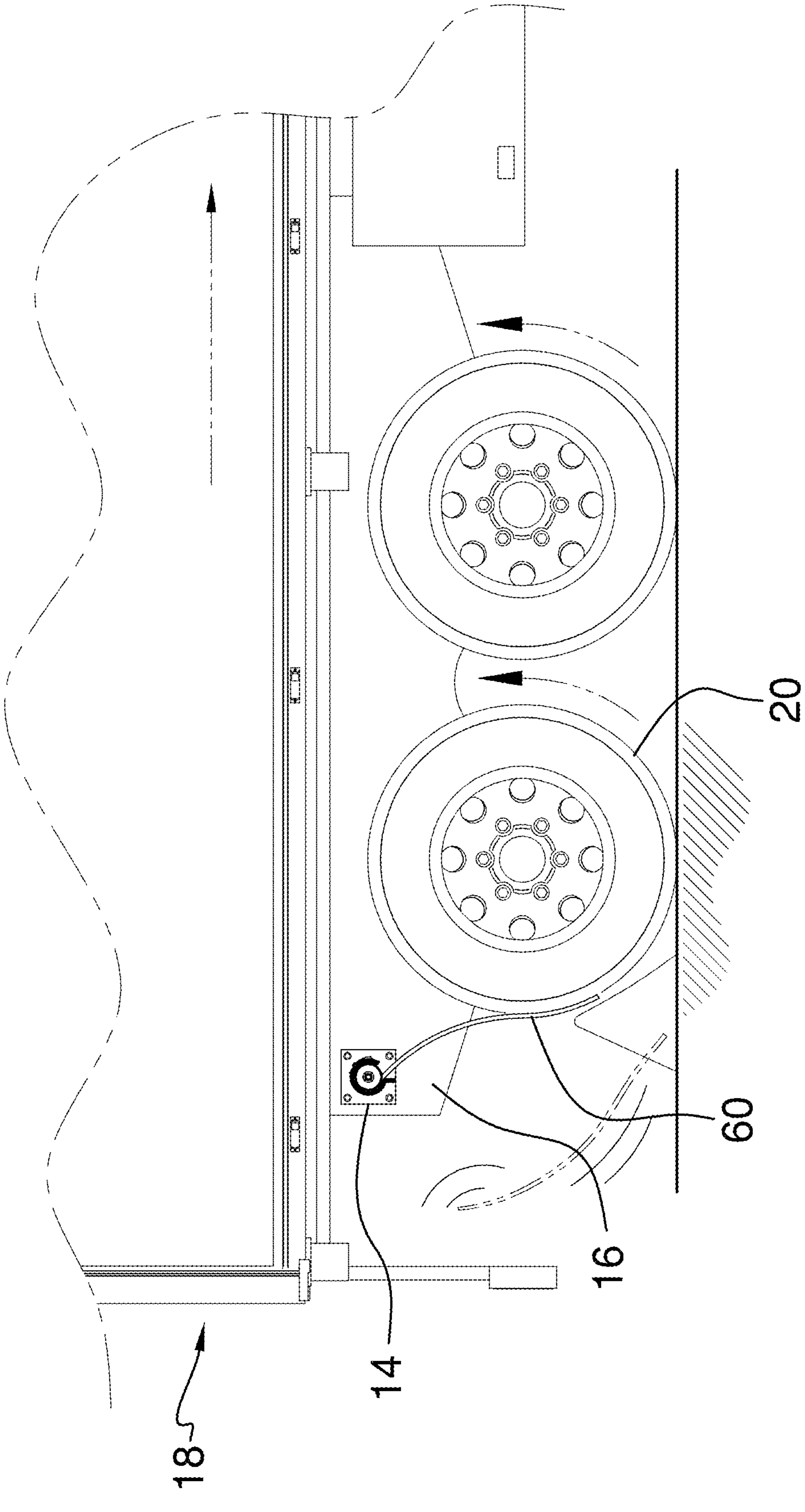
FIG. 8 is a perspective in-use view of an embodiment of the disclosure.

With reference now to the drawings, and in particular to FIGS. 1 through 8 thereof, a new mud flap device embodying the principles and concepts of an embodiment of the disclosure and generally designated by the reference numeral 10 will be described.

As best illustrated in FIGS. 1 through 8, the mud flap holder device 10 generally comprises a cylindrical housing 12 which has a mounting plate 14 that is disposed on an end of the cylindrical housing 12. The mounting plate 14 is attachable to a frame 16 of a vehicle 18 having the cylindrical housing 12 being horizontally oriented behind a wheel 20 of the vehicle 18. The vehicle 18 may be a cargo vehicle, such as a semi tractor-trailer for example, or other type of cargo vehicle commonly driven on public roadways. The cylindrical housing 12 has a jaw 22 which is integrated into the cylindrical housing 12.

The cylindrical housing 12 has a first end 24 and a second end 26 and an outer wall 28 extending between the first end 24 and the second end 26; the cylindrical housing 12 is elongated between the first end 24 and the second end 26. The outer wall 28 is substantially arcuate about an axis extending between the first end 24 and the second end 26 such that the cylindrical housing 12 has a cylindrical shape. The outer wall 28 has a first edge 30 extending between the first end 24 and the second end 26 and the outer wall 28 has a second edge 32 extending between the first end 24 and the second end 26. The first edge 30 is spaced from the second edge 32 to define an opening 34 into the cylindrical housing 12 which extends between the first end 24 and the second end 26.

The mounting plate 14 has a front surface 36 which is attached to the second end 26. The mounting plate 14 has a plurality of fastener holes 38 each extending through the front surface 36 and a back surface 40 of the mounting plate 14. Additionally, each of the plurality of fastener holes 38 is aligned with a respective one of four corners 42 of the mounting plate 14. The back surface 40 of the mounting plate 14 abuts the frame 16 of the vehicle 18 thereby enabling each of the plurality of fastener holes 38 to insertably receive a fastener 44 which engages the frame 16 for attaching the mounting plate 14 to the frame 16.

The outer wall 28 of the cylindrical housing 12 has a bend 46 extending between the first end 24 and the second end 26. The bend 46 is spaced from the second edge 32 of the outer wall 28 to define a jaw portion 48 of the outer wall 28 which extends downwardly from the cylindrical housing 12 when the mounting plate 14 is attached to the frame 16 of the vehicle 18. Furthermore, the jaw portion 48 of the outer wall 28 defines the jaw 22 of the cylindrical housing 12. The outer wall 28 has a curved portion 50 which curves outwardly from a center of the cylindrical housing 12. The curved portion 50 extends between the first end 24 and the second end 26 to define a channel 52 which extends between the first end 24 and the second end 26. Additionally, the curved portion 50 is positioned closer to the first edge 30 of the outer wall 28 than the bend 46 in the outer wall 28.

The cylindrical housing 12 has a plurality of slots 54 each extending through the outer wall 28. Each of the plurality of slots 54 is elongated about an axis which is oriented perpendicular to the axis extending between the first end 24 and the second end 26 of the cylindrical housing 12. The plurality of slots 54 is evenly spaced apart from each other and is distributed between the first end 24 and the second end 26. Additionally, each of the plurality of slots 54 extends across the channel 52 defined by the curved portion 50 of the outer wall 28.

A roller 56 is rotatably positioned in the cylindrical housing 12 and the roller 56 has a jaw 58 extending downwardly from the roller 56. The roller 56 is rotatable in a first direction having the jaw 58 on the roller 56 moving toward the jaw 22 of the cylindrical housing 12. In this way a mud flap 60 can be compressed between the jaw 58 of the roller 56 and the jaw 22 of the cylindrical housing 12 for releasably retaining the mud flap 60 on the vehicle 18. Furthermore, the mud flap 60 is pulled outwardly from between the jaw 58 of the roller 56 and the jaw 22 of the cylindrical housing 12 when the wheel 20 of the vehicle 18 rolls over the mud flap 60 when the vehicle 18 is backing. In this way the mud flap 60 is inhibited from being damaged to enable a driver of the vehicle 18 to re-attach the mud flap 60 to the vehicle 18 without requiring tools. Additionally, the roller 56 is rotatable in a second direction having the jaw 58 of the roller 56 moving away from the jaw 22 of the cylindrical housing 12 thereby enabling the mud flap 60 to be positioned between the jaw 58 of the roller 56 and the jaw 22 of the cylindrical housing 12.

The roller 56 has a primary end 64 and a secondary end 66 and an outer surface 68 extending between the primary end 64 and the secondary end 66; the roller 56 is elongated between the primary end 64 and the secondary end 66. The outer surface 68 is continuously arcuate about an axis extending between the primary end 64 and the secondary end 66 such that the roller 56 has a cylindrical shape. The primary end 64 is aligned with the first end 24 of the cylindrical housing 12 and the secondary end 66 is aligned with the second end 26 of the cylindrical housing 12. The jaw 58 of the roller 56 extends between the primary end 64 and the secondary end 66 having the jaw 58 of the roller 56 being perpendicular to the outer surface 68. Additionally, the jaw 58 of the roller 56 is positioned in the opening 34 defined in the cylindrical housing 12. The jaw 58 of the roller 56 moves toward the jaw portion 48 of the outer wall 28 of the cylindrical housing 12 when the roller 56 is rotated in the first direction.

The roller 56 has a well 70 extending into the primary end 64. Additionally, the well 70 has a bounding surface 72 which has a plurality of intersecting sides 74 such that the well 70 has a rectangular shape. In this way the well 70 is matable to a socket wrench 76 thereby enabling the driver to employ the socket wrench 76 to rotate the roller 56 in the first direction for compressing the mud flap 60 between the jaw 58 of the roller 56 and the jaw portion 48 of the outer wall 28 of the cylindrical housing 12. In this way the driver can attach the mud flap 60 to the vehicle 18. Furthermore, each of the intersecting sides 74 of the bounding surface 72 of the well 70 has a length of approximately 12.7 mm thereby enabling the well 70 to be matable to a half-inch socket wrench 76. In this way the driver can employ the half-inch socket wrench 76 to generate sufficient rotational torque to firmly compress the mud flap 60 between the jaw 58 of the roller 56 and the jaw portion 48 of the outer wall 28 of the cylindrical housing 12.

A plurality of ring gears 78 is provided and each of the plurality of ring gears 78 extends around the outer surface 68 of the roller 56. The ring gears 78 are spaced apart from each other and are distributed between the primary end 64 and the secondary end 66 of the roller 56. Each of the plurality of ring gears 78 is aligned with a respective one of the plurality of slots 54 in the outer wall 28 of the cylindrica housing 12. Additionally, each of the plurality of ring gears 78 has a plurality of teeth 80 integrated into an exterior surface 82 of the ring gears 78 which are distributed around a full circumference of the ring gears 78. Additionally, each of the plurality of teeth 80 associated with each of the plurality of ring gears 78 has a front surface 84 which is perpendicularly oriented with the outer surface 68 of the roller 56 and a back surface 86 which is oriented at a sloped angle with the outer surface 68 of the roller 56.

A plurality of bearings 88 is provided and each of the plurality of bearings 88 extends around the outer surface 68 of the roller 56. The roller 56 is rotatable in the plurality of bearings 88 and each of the plurality of bearings 88 is positioned between a respective pair of the ring gears 78. Each of the plurality of bearings 88 may comprise a ball bearing type of bearing or other type of friction reducing bearing. A plurality of fasteners 90 is provided and each of the plurality of fasteners 90 extends through the outer wall 28 of the cylindrical housing 12 and engages a respective one of the plurality of bearings 88 for rotatably retaining the roller 56 in the cylindrical housing 12. Each of the plurality of fasteners 90 may comprise a screw, a bolt or other type of threaded fastener.

A locking mechanism 92 is provided and the locking mechanism 92 is movably attached to the cylindrical housing 12. The locking mechanism 92 is biased into a locking position having the locking mechanism 92 releasably engaging the roller 56 for inhibiting the roller 56 from being rotated. In this way the mud flap 60 can be compressed between the jaw 58 of the roller 56 and the jaw 22 of the cylindrical housing 12. The locking mechanism 92 is urgeable into an unlocking condition thereby enabling the roller 56 to be rotated for positioning the mud flap 60 between the jaw 58 of the roller 56 and the jaw 22 of the cylindrical housing 12. In this way the locking mechanism 92 enables the driver to install the mud flap 60 on the vehicle 18.

The locking mechanism 92 comprises a rod 94 which is rotatably positioned in the channel 52 defined in the curved portion 50 of the outer wall 28 of the cylinder. The locking mechanism 92 includes a plurality of fingers 96 and each of the plurality of fingers 96 is attached to the rod 94 having each of the plurality of fingers 96 being perpendicular to the rod 94. The fingers 96 are spaced apart from each other and are distributed along the rod 94. Each of the fingers 96 is positioned in a respective one of the plurality of slots 54 in the outer wall 28 of the cylindrical housing 12.

Each of the plurality of fingers 96 has a grip 98 which extends toward the roller 56. The grip 98 on each of the plurality of fingers 96 engages the teeth 80 of a respective one of the plurality of ring gears 78. The grip 98 on each of the plurality of fingers 96 is slidable along the back surface 86 of the plurality of teeth 80 on the respective ring gear 78 when the roller 56 is rotated in the first direction. In this way the mud flap 60 can be compressed between the jaw 58 of the roller 56 and the jaw portion 48 of the outer wall 28 of the cylindrical housing 12. The grip 98 on each of the plurality of fingers 96 abuts the front surface 84 of a respective one of the plurality of teeth 80 associated with the respective ring gear 78. In this way the roller 56 is inhibited from rotating in the second direction thereby releasably retaining the mud flap 60 between the jaw 58 of the roller 56 and the jaw portion 48 of the outer wall 28 of the cylindrical housing 12.

A respective one of the plurality of fingers 96 has a tab 100 which extends outwardly through the respective slot 54 in which the respective finger 96 is positioned. The tab 100 can be manipulated by the driver to urge the locking mechanism 92 into the unlocking condition. The locking mechanism 92 includes a plurality of biasing members 102. Each of the plurality of biasing members 102 extends between the outer wall 28 of the cylindrical housing 12 and a respective one of the plurality of fingers 96. Furthermore, each of the plurality of biasing members 102 urges the grip 98 on each of the plurality of fingers 96 to engage the teeth 80 on the respective ring gear.

In use, the locking mechanism 92 is urged into the unlocking condition to enable the roller 56 to be rotated in the second direction and the mud flap 60 is positioned between the jaw 58 of the roller 56 and the jaw 22 of the cylindrical housing 12. The locking mechanism 92 is released to enable the locking mechanism 92 to be biased into the locking condition and the socket wrench 76 is inserted into the well 70 in the primary end 64. The socket wrench 76 is employed to rotate the roller 56 in the first direction until the mud flap 60 is compressed between the jaw 58 of the roller 56 and the jaw 22 of the cylindrical housing 12 with sufficient force to retain the mud flap 60 on the vehicle 18. The mud flap 60 is pulled outwardly from between the jaw 58 of the roller 56 and the jaw 22 of the cylindrical housing 12 when the wheel 20 of vehicle 18 rolls over the mud flap 60 when the vehicle 18 is backing up. In this way the mud flap 60 is inhibited from being damaged when the wheel 20 of the vehicle 18 backs over the mud flap 60. Thus, the mud flap 60 can be re-installed on the vehicle 18 without requiring the mud flap 60 to be repaired or modified.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mud flap holder device for releasably attaching a mud flap to a vehicle, said device comprising:

a cylindrical housing having a mounting plate being disposed on an end of said cylindrical housing, said mounting plate being attachable to a frame of a vehicle having said cylindrical housing being horizontally oriented behind a wheel of said vehicle, said cylindrical housing having a jaw being integrated into said cylindrical housing;

a roller being rotatably positioned in said cylindrical housing, said roller having a jaw extending downwardly from said roller, said roller being rotatable in a first direction having said jaw of said roller moving toward said jaw of said cylindrical housing thereby enabling a mud flap to be compressed between said jaw of said roller and said jaw of said cylindrical housing for releasably retaining said mud flap on said vehicle, said mud flap being pulled outwardly from between said jaw of said roller and said jaw of said cylindrical housing when said wheel of said vehicle rolls over said mud flap when said vehicle is backing up thereby inhibiting said mud flap from being damaged wherein said roller and said cylindrical housing is each configured to enable a driver of said vehicle to re-attach said mud flap to said vehicle without requiring tools, said roller being rotatable in a second direction having said jaw of said roller moving away from said jaw of said cylindrical housing thereby enabling said mud flap to be positioned between said jaw of said roller and said jaw of said cylindrical housing; and a locking mechanism being movably attached to said cylindrical housing, said locking mechanism being biased into a locking position having said locking mechanism releasably engaging said roller for inhibiting said roller from being rotated thereby enabling said mud flap to be compressed between said jaw of said roller and said jaw of said cylindrical housing, said locking mechanism being urgeable into an unlocking condition thereby enabling said roller to be rotated thereby enabling said mud flap to be positioned between said jaw of said roller and said jaw of said cylindrical housing wherein said locking mechanism is configured to enable the driver to install said mud flap on said vehicle.

2. The device according to claim 1, wherein:

said cylindrical housing has a first end and a second end and an outer wall extending between said first end and said second end;

said cylindrical housing is elongated between said first end and said second end;

said outer wall is substantially arcuate about an axis extending between said first end and said second end such that said cylindrical housing has a cylindrical shape;

said outer wall has a first edge extending between said first end and said second end;

said outer wall has a second edge extending between said first end and said second end;

said first edge is spaced from said second edge to define an opening into said cylindrical housing which extends between said first end and said second end;

said mounting plate has a front surface being attached to said second end;

said mounting plate has a plurality of fastener holes each extending through said front surface and a back surface of said mounting plate;

each of said plurality of fastener holes is aligned with a respective one of four corners of said mounting plate;

said back surface of said mounting plate abuts said frame of said vehicle thereby enabling each of said plurality of fastener holes to insertably receive a fastener which engages said frame for attaching said mounting plate to said frame;

said outer wall has a bend extending between said first end and said second end;

said bend is spaced from said second edge of said outer wall to define a jaw portion of said outer wall which extends downwardly from said cylindrical housing when said mounting plate is attached to said frame of said vehicle; and said jaw portion of said outer wall defines said jaw of said cylindrical housing.

3. The device according to claim 2, wherein:

said outer wall has a curved portion which curves outwardly from a center of said cylindrical housing;

said curved portion extends between said first end and said second end to define a channel which extends between said first end and said second end; and said curved portion is positioned closer to said first edge of said outer wall than said bend in said outer wall.

4. The device according to claim 3, wherein:

said cylindrical housing has a plurality of slots each extending through said outer wall;

each of said plurality of slots is elongated about an axis being oriented perpendicular to said axis extending between said first end and said second end of said cylindrical housing;

said plurality of slots is evenly spaced apart from each other and is distributed between said first end and said second end; and each of said plurality of slots extends across said channel defined by said curved portion of said outer wall.

5. The device according to claim 4, wherein:

said roller has a primary end and a secondary end and an outer surface extending between said primary end and said secondary end;

said roller is elongated between said primary end and said secondary end;

said outer surface is continuously arcuate about an axis extending between said primary end and said secondary end such that said roller has a cylindrical shape;

said primary end is aligned with said first end of said cylindrical housing;

said secondary end is aligned with said second end of said cylindrical housing;

said jaw of said roller extends between said primary end and said secondary end having said jaw of said roller being perpendicular to said outer surface;

said jaw of said roller is positioned in said opening defined in said cylindrical housing;

said jaw of said roller moves toward said jaw portion of said outer wall of said cylindrical housing when said roller is rotated in said first direction;

said roller has a well extending into said primary end;

said well has a bounding surface which has a plurality of intersecting sides such that said well has a rectangular shape wherein said well is configured to be matable to a socket wrench thereby enabling the driver to employ the socket wrench to rotate said roller in said first direction for compressing said mud flap between said jaw of said roller and said jaw portion of said outer wall of said cylindrical housing for attaching said mud flap to said vehicle;

said device includes a plurality of ring gears;

each of said plurality of ring gears extends around said outer surface of said roller;

said plurality of ring gears is spaced apart from each other and is distributed between said primary end and said secondary end of said roller; and each of said plurality of ring gears is aligned with a respective one of said plurality of slots in said outer wall of said cylindrica housing.

6. The device according to claim 5, wherein:

each of said plurality of ring gears has a plurality of teeth being integrated into an exterior surface of said ring gears which are distributed around a full circumference of said ring gears;

each of said plurality of teeth associated with each of said plurality of ring gears has a front surface being perpendicularly oriented with said outer surface of said roller and a back surface being oriented at a sloped angle with said outer surface of said roller.

7. The device according to claim 5, wherein:

said device includes a plurality of bearings;

each of said plurality of bearings extends around said outer surface of said roller;

said roller is rotatable in said plurality of bearings;

each of said plurality of bearings is positioned between a respective pair of said ring gears;

said device includes a plurality of fasteners; and each of said plurality of fasteners extends through said outer wall of said cylindrical housing and engages a respective one of said plurality of bearings for rotatably retaining said roller in said cylindrical housing.

8. The device according to claim 6, wherein:

said locking mechanism includes a rod being rotatably positioned in said channel defined in said curved portion of said outer wall of said cylinder;

said locking mechanism includes a plurality of fingers;

each of said plurality of fingers is attached to said rod having each of said plurality of fingers being perpendicular to said rod;

said plurality of fingers is spaced apart from each other and is distributed along said rod;

each of said fingers is positioned in a respective one of said plurality of slots in said outer wall of said cylindrical housing;

each of said plurality of fingers has a grip being extending toward said roller;

said grip on each of said plurality of fingers engages said teeth of a respective one of said plurality of ring gears;

said grip on each of said plurality of fingers is slidable along said back surface of said plurality of teeth on said respective ring gear when said roller is rotated in said first direction thereby enabling said mud flap to be compressed between said jaw of said roller and said jaw portion of said outer wall of said cylindrical housing;

said grip on each of said plurality of fingers abuts said front surface of a respective one of said plurality of teeth associated with said respective ring gear thereby inhibiting said roller from rotating in said second direction thereby releasably retaining said mud flap between said jaw of said roller and said jaw portion of said outer wall of said cylindrical housing; and a respective one of said plurality of fingers has a tab which extends outwardly through said respective slot in which said respective finger is positioned wherein said tab is configured to be manipulated by the driver to urge said locking mechanism into said unlocking condition.

9. The device according to claim 8, wherein:

said locking mechanism includes a plurality of biasing members; and each of said plurality of biasing members extends between said outer wall of said cylindrical housing and a respective one of said plurality of fingers thereby urging said grip on each of said plurality of fingers to engage said teeth on said respective ring gear.

10. A mud flap holder device for releasably attaching a mud flap to a vehicle, said device comprising:

a cylindrical housing having a mounting plate being disposed on an end of said cylindrical housing, said mounting plate being attachable to a frame of a vehicle having said cylindrical housing being horizontally oriented behind a wheel of said vehicle, said cylindrical housing having a jaw being integrated into said cylindrical housing, said cylindrical housing having a first end and a second end and an outer wall extending between said first end and said second end, said cylindrical housing being elongated between said first end and said second end, said outer wall being substantially arcuate about an axis extending between said first end and said second end such that said cylindrical housing has a cylindrical shape, said outer wall having a first edge extending between said first end and said second end, said outer wall having a second edge extending between said first end and said second end, said first edge being spaced from said second edge to define an opening into said cylindrical housing which extends between said first end and said second end, said mounting plate having a front surface being attached to said second end, said mounting plate having a plurality of fastener holes each extending through said front surface and a back surface of said mounting plate, each of said plurality of fastener holes being aligned with a respective one of four corners of said mounting plate, said back surface of said mounting plate abutting said frame of said vehicle thereby enabling each of said plurality of fastener holes to insertably receive a fastener which engages said frame for attaching said mounting plate to said frame, said outer wall having a bend extending between said first end and said second end, said bend being spaced from said second edge of said outer wall to define a jaw portion of said outer wall which extends downwardly from said cylindrical housing when said mounting plate is attached to said frame of said vehicle, said jaw portion of said outer wall defining said jaw of said cylindrical housing, said outer wall having a curved portion which curves outwardly from a center of said cylindrical housing, said curved portion extending between said first end and said second end to define a channel which extends between said first end and said second end, said curved portion being positioned closer to said first edge of said outer wall than said bend in said outer wall, said cylindrical housing having a plurality of slots each extending through said outer wall, each of said plurality of slots being elongated about an axis being oriented perpendicular to said axis extending between said first end and said second end of said cylindrical housing, said plurality of slots being evenly spaced apart from each other and being distributed between said first end and said second end, each of said plurality of slots extending across said channel defined by said curved portion of said outer wall;

a roller being rotatably positioned in said cylindrical housing, said roller having a jaw extending downwardly from said roller, said roller being rotatable in a first direction having said jaw of said roller moving toward said jaw of said cylindrical housing thereby enabling a mud flap to be compressed between said jaw of said roller and said jaw of said cylindrical housing for releasably retaining said mud flap on said vehicle, said mud flap being pulled outwardly from between said jaw of said roller and said jaw of said cylindrical housing when said wheel of said vehicle rolls over said mud flap when said vehicle is backing up thereby inhibiting said mud flap from being damaged wherein said roller and said cylindrical housing is each configured to enable a driver of said vehicle to re-attach said mud flap to said vehicle without requiring tools, said roller being rotatable in a second direction having said jaw of said roller moving away from said jaw of said cylindrical housing thereby enabling said mud flap to be positioned between said jaw of said roller and said jaw of said cylindrical housing, said roller having a primary end and a secondary end and an outer surface extending between said primary end and said secondary end, said roller being elongated between said primary end and said secondary end, said outer surface being continuously arcuate about an axis extending between said primary end and said secondary end such that said roller has a cylindrical shape, said primary end being aligned with said first end of said cylindrical housing, said secondary end being aligned with said second end of said cylindrical housing, said jaw of said roller extending between said primary end and said secondary end having said jaw of said roller being perpendicular to said outer surface, said jaw of said roller being positioned in said opening defined in said cylindrical housing, said jaw of said roller moving toward said jaw portion of said outer wall of said cylindrical housing when said roller is rotated in said first direction, said roller having a well extending into said primary end, said well having a bounding surface which has a plurality of intersecting sides such that said well has a rectangular shape wherein said well is configured to be matable to a socket wrench thereby enabling the driver to employ the socket wrench to rotate said roller in said first direction for compressing said mud flap between said jaw of said roller and said jaw portion of said outer wall of said cylindrical housing for attaching said mud flap to said vehicle;

a plurality of ring gears, each of said plurality of ring gears extending around said outer surface of said roller, said plurality of ring gears being spaced apart from each other and being distributed between said primary end and said secondary end of said roller, each of said plurality of ring gears being aligned with a respective one of said plurality of slots in said outer wall of said cylindrica housing, each of said plurality of ring gears having a plurality of teeth being integrated into an exterior surface of said ring gears which are distributed around a full circumference of said ring gears, each of said plurality of teeth associated with each of said plurality of ring gears having a front surface being perpendicularly oriented with said outer surface of said roller and a back surface being oriented at a sloped angle with said outer surface of said roller;

a plurality of bearings, each of said plurality of bearings extending around said outer surface of said roller, said roller being rotatable in said plurality of bearings, each of said plurality of bearings being positioned between a respective pair of said ring gears;

a plurality of fasteners, each of said plurality of fasteners extending through said outer wall of said cylindrical housing and engaging a respective one of said plurality of bearings for rotatably retaining said roller in said cylindrical housing; and a locking mechanism being movably attached to said cylindrical housing, said locking mechanism being biased into a locking position having said locking mechanism releasably engaging said roller for inhibiting said roller from being rotated thereby enabling said mud flap to be compressed between said jaw of said roller and said jaw of said cylindrical housing, said locking mechanism being urgeable into an unlocking condition thereby enabling said roller to be rotated thereby enabling said mud flap to be positioned between said jaw of said roller and said jaw of said cylindrical housing wherein said locking mechanism is configured to enable the driver to install said mud flap on said vehicle, said locking mechanism comprising:

a rod being rotatably positioned in said channel defined in said curved portion of said outer wall of said cylinder;

a plurality of fingers, each of said plurality of fingers being attached to said rod having each of said plurality of fingers being perpendicular to said rod, said plurality of fingers being spaced apart from each other and being distributed along said rod, each of said fingers being positioned in a respective one of said plurality of slots in said outer wall of said cylindrical housing, each of said plurality of fingers having a grip being extending toward said roller, said grip on each of said plurality of fingers engaging said teeth of a respective one of said plurality of ring gears, said grip on each of said plurality of fingers being slidable along said back surface of said plurality of teeth on said respective ring gear when said roller is rotated in said first direction thereby enabling said mud flap to be compressed between said jaw of said roller and said jaw portion of said outer wall of said cylindrical housing, said grip on each of said plurality of fingers abutting said front surface of a respective one of said plurality of teeth associated with said respective ring gear thereby inhibiting said roller from rotating in said second direction thereby releasably retaining said mud flap between said jaw of said roller and said jaw portion of said outer wall of said cylindrical housing, a respective one of said plurality of fingers having a tab which extends outwardly through said respective slot in which said respective finger is positioned wherein said tab is configured to be manipulated by the driver to urge said locking mechanism into said unlocking condition; and a plurality of biasing members, each of said plurality of biasing members extending between said outer wall of said cylindrical housing and a respective one of said plurality of fingers thereby urging said grip on each of said plurality of fingers to engage said teeth on said respective ring gear.

* * * * *